United States Patent
Shim et al.

(10) Patent No.: US 9,035,964 B2
(45) Date of Patent: May 19, 2015

(54) METHOD AND APPARATUS FOR OBTAINING LIGHTING INFORMATION AND MATERIAL INFORMATION IN IMAGE MODELING SYSTEM

(75) Inventors: Hyun Jung Shim, Seoul (KR); Do Kyoon Kim, Gyeonggi-do (KR); Seung Kyu Lee, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 324 days.

(21) Appl. No.: 13/467,218

(22) Filed: May 9, 2012

(65) Prior Publication Data

US 2013/0021340 A1 Jan. 24, 2013

(51) Int. Cl.
| | |
|---|---|
| G09G 5/00 | (2006.01) |
| G09G 5/02 | (2006.01) |
| G06T 15/00 | (2011.01) |
| G03F 3/08 | (2006.01) |
| H04N 1/46 | (2006.01) |
| G06K 9/00 | (2006.01) |
| G06K 9/40 | (2006.01) |
| G06K 9/36 | (2006.01) |
| A63F 13/00 | (2014.01) |
| G06T 7/40 | (2006.01) |
| G06T 15/50 | (2011.01) |

(52) U.S. Cl.
CPC ................ *G06T 7/408* (2013.01); *G06T 15/50* (2013.01)

(58) Field of Classification Search
USPC ......... 345/418–419, 426, 428, 581, 589–593, 345/600, 606, 610, 616, 619, 586, 643, 650, 345/690; 348/42, 51; 358/515–520, 525, 358/448; 382/162, 164, 165, 167, 154, 254, 382/274, 276, 285; 463/30–32
See application file for complete search history.

(56) References Cited

U.S. PATENT DOCUMENTS

| | | | | |
|---|---|---|---|---|
| 6,160,907 | A * | 12/2000 | Robotham et al. | 382/154 |
| 8,363,930 | B1 * | 1/2013 | Francis et al. | 382/154 |
| 2003/0231175 | A1 * | 12/2003 | Pfister et al. | 345/419 |
| 2004/0001059 | A1 * | 1/2004 | Pfister et al. | 345/419 |
| 2004/0095357 | A1 * | 5/2004 | Oh et al. | 345/589 |
| 2009/0116736 | A1 * | 5/2009 | Neogi et al. | 382/159 |
| 2011/0032328 | A1 * | 2/2011 | Raveendran et al. | 348/43 |
| 2011/0050885 | A1 | 3/2011 | McEldowney | |

FOREIGN PATENT DOCUMENTS

| | | |
|---|---|---|
| JP | 2008-108118 | 5/2008 |
| JP | 2010-72983 | 4/2010 |
| KR | 10-2006-0041060 | 5/2006 |
| KR | 10-2007-0026701 | 3/2007 |
| KR | 10-2009-0004931 | 1/2009 |
| KR | 10-2009-0042135 | 4/2009 |
| KR | 10-2010-0002799 | 1/2010 |
| KR | 10-2011-0018542 | 2/2011 |

* cited by examiner

*Primary Examiner* — Wesner Sajous
(74) *Attorney, Agent, or Firm* — Harness, Dickey & Pierce, P.L.C.

(57) ABSTRACT

An apparatus and method for obtaining lighting information and material information in an image modeling system are provided. A material constant of a same material region and lighting information of the same material region may be extracted by applying color channel pixel values, depth values, and viewpoint information to a linear system in which a pixel value is defined by a material constant and a combination of a geometry component with a lighting component.

25 Claims, 9 Drawing Sheets

420  421

METHOD AND APPARATUS FOR OBTAINING LIGHTING INFORMATION AND MATERIAL INFORMATION IN IMAGE MODELING SYSTEM

CROSS-REFERENCE TO RELATED APPLICATIONS

This application claims the benefit of Korean Patent Application No. 10-2011-0071353, filed on Jul. 19, 2011, in the Korean Intellectual Property Office, the disclosure of which is incorporated herein by reference.

BACKGROUND

1. Field

Example embodiments of the following description relate to a method and apparatus for obtaining lighting information and material information in an image modeling system.

2. Description of the Related Art

Due to development of three-dimensional (3D) graphics technologies and 3D graphic-related hardware technologies, content is being produced to realistically represent an object in various application fields, such as 3D games, 3D movies, smartphones, and the like. To realistically represent an object, a rendering technology may be used. In the rendering technology, modeling needs to be accurately performed on geometry, material properties, and lighting.

Information regarding material properties or materials may be obtained by capturing an object in a restricted space using special equipment. However, it is difficult to apply a scheme or technique of using the special equipment to various environments, and is also difficult for users to secure content.

To perform modeling of light or lighting, an omni-direction lighting environment map may be used. However, to extract a lighting environment map, a special auxiliary device is required. In other words, there is a limitation to the modeling of a dynamic lighting environment.

SUMMARY

Additional aspects and/or advantages will be set forth in part in the description which follows and, in part, will be apparent from the description, or may be learned by practice of the invention.

The foregoing and/or other aspects are achieved by providing a method for obtaining lighting information and material information in an image modeling system, including analyzing material properties of an object using color images of multi-view image pairs of the object, the multi-view image pairs each being formed of a depth image and a color image for a single viewpoint, separating a same material region from the object based on the material properties, the same material region having the same material properties, acquiring, from each of the color images, color channel pixel values of a plurality of pixels included in the same material region, and extracting a material constant of the same material region and lighting information of the same material region, by applying the color channel pixel values to a linear system in which a pixel value is defined by a material constant and a combination of a geometry component with a lighting component.

The foregoing and/or other aspects are also achieved by providing a method for obtaining lighting information and material information in an image modeling system, including receiving color channel pixel values of N pixels included in a same material region, the same material region having the same material properties, and N being an integer equal to or greater than 2, receiving depth values of the same material region, receiving viewpoint information associated with the same material region, and extracting a material constant of the same material region and lighting information of the same material region, by applying the received color channel pixel values, the received depth values, and the received viewpoint information to a linear system in which a pixel value is defined by a material constant and a combination of a geometry component with a lighting component.

The foregoing and/or other aspects are also achieved by providing an apparatus for obtaining lighting information and material information in an image modeling system, including a pixel value receiver to receive color channel pixel values of N pixels included in a same material region, the same material region having the same material properties, and N being an integer equal to or greater than 2, a depth value receiver to receive depth values of the same material region, a viewpoint information receiver to receive viewpoint information associated with the same material region, and a calculating unit to calculate a material constant of the same material region and lighting information of the same material region, by applying the color channel pixel values, the depth values, and the viewpoint information to a linear system in which a pixel value is defined by a material constant and a combination of a geometry component with a lighting component.

The foregoing and/or other aspects are also achieved by providing an apparatus for obtaining lighting information and material information in an image modeling system, including a material property analyzing unit to analyze material properties of an object using each of color images of multi-view image pairs of the object, the multi-view image pairs each being formed of a depth image and a color image for a single viewpoint, a region separating unit to separate a same material region from the object based on the material properties, the same material region having the same material properties, a pixel value acquiring unit to acquire, from each of the color images, color channel pixel values of a plurality of pixels included in the same material region, and an extracting unit to extract a material constant of the same material region and lighting information of the same material region, by applying the color channel pixel values to a linear system in which a pixel value is defined by a material constant and a combination of a geometry component with a lighting component.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the example embodiments, taken in conjunction with the accompanying drawings of which.

DETAILED DESCRIPTION

Figure 1:
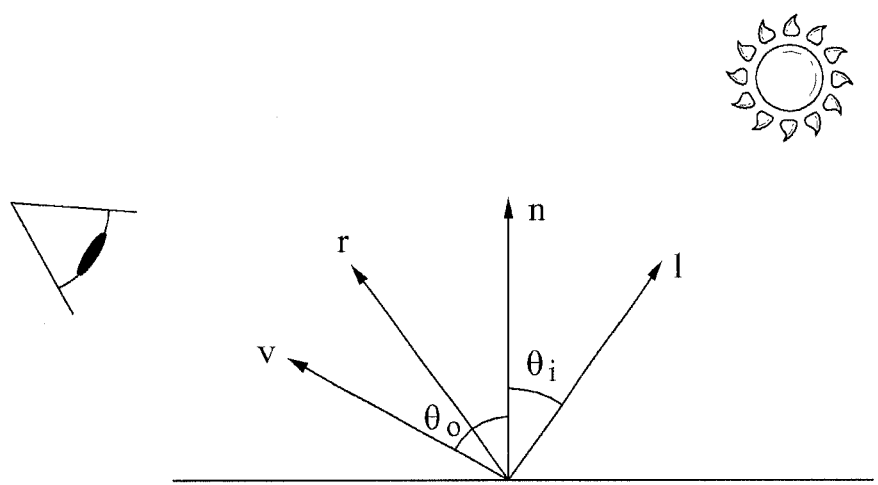
FIG. 1 illustrates a diagram of main variables having an influence on pixel values according to example embodiments.

Reference will now be made in detail to example embodiments, examples of which are illustrated in the accompanying drawings, wherein like reference numerals refer to the like elements throughout. Example embodiments are described below to explain the present disclosure by referring to the figures.

A principle of obtaining lighting information and material information is to use a linear system in which a pixel value is defined by a material constant and a combination of a geometry component with a lighting component. The lighting information and the material information may be extracted by obtaining a solution of unknown quantities of the linear system using multi-view image pairs. The multi-view image pairs may be acquired by capturing an object from multiple viewpoints. Each of the multi-view image pairs may include a depth image and a color image that are seen from a single viewpoint.

FIG. 1 illustrates a diagram of main variables having an influence on pixel values according to example embodiments.

Referring to FIG. 1, main variables, having an influence on a brightness value of a predetermined pixel in an image, may include a vector V indicating camera information regarding a predetermined surface point, a vector I indicating a lighting constant, a normal vector n of the surface point, and a vector r indicating a reflection lighting environment. The vector V may refer to viewpoint information represented by a position vector of a camera with respect to the surface point.

For convenience of description, when a Phong illumination model is assumed to be used as an illumination model, a brightness value or pixel value of a pixel i in an image may be represented as shown in Equation 1.

$$i = K_d n^T 1 + K_s r^T v \qquad \text{[Equation 1]}$$
$$= K_d G_d + K_s G_s$$

In Equation 1, $K_d$ denotes a material constant of a diffuse component, and $K_s$ denotes a material constant of a specular component. Accordingly, modeling may be performed on the pixel value by the material constants $K_d$ and $K_s$, and $G_d$ and $G_s$. In Equation 1, each of $G_d$ and $G_s$ denotes a combination of a geometry component and a lighting component. Additionally, $(.)^T$ denotes a transpose.

Additionally, the Torrance-Sparrow model, the Oren-Nayar model, the dipole model, and the like, may also be used as an illumination model. For example, when illumination models other than the Phong illumination model are used, the brightness value or pixel value of the pixel i may be expressed by a multiplication of a material component by other components. Here, the other components may be represented as a combination of geometry and lighting. In Equation 1, I denotes a single lighting constant in the form of a 3D vector. According to an aspect, a lighting environment may be represented as a sum of a plurality of lightings (sources), instead of a single lighting (source). For example, the lighting constant I may be represented as a sum of a basis function, as shown in "I=$c_1 e_1 + c_2 e_2 \ldots + c_p e_p$." In this example, $c_1, c_2, \ldots$, and $c_p$ may denote lighting constants of the plurality of lightings. In this example, $e_1, e_2, \ldots$, and $e_p$ may denote basis of the basis function.

The material constant $K_d$ between the material constants $K_d$ and $K_s$ may be assumed to have an influence on colors. In other words, the material constant $K_s$ may be irrelevant to a change in colors. Accordingly, a color of the pixel i may be defined, as shown in Equation 2.

$$\begin{bmatrix} i^r \\ i^g \\ i^b \end{bmatrix} = \begin{bmatrix} K_d^r & K_s \\ K_d^g & K_s \\ K_d^b & K_s \end{bmatrix} \begin{bmatrix} G_d \\ G_s \end{bmatrix} \qquad \text{[Equation 2]}$$

In Equation 2, $i^r$ denotes a red value of the pixel i, i g denotes a green value of the pixel i, and $i^b$ denotes a blue value of the pixel i. Additionally, "$i^r$," "$i^g$," and "$i^b$" may be referred to as "color channel pixel values." Furthermore, $K_d^r$ denotes a material constant of a diffuse component for $i^r$, $K_d^g$ denotes a material constant of a diffuse component for $i^g$, and $K_d^b$ denotes a material constant of a diffuse component for $i^b$.

Equation 2 may be called a linear system associated with color values. For convenience of description, a linear system defined as shown in Equation 2 may be referred to as a "first linear system." A part of variables of the first linear system may be verified or acquired from a depth image and a color image. For example, a part of factors of $[G_d, G_s]$, such as depth information "n," camera information "v," and $[i^r, i^g, i^b]$, may be acquired from an input depth image and an input color image. Additionally, unknown quantities of the first linear system may include four material variables, and the lighting constant I that may be represented as a 3D vector. The other variables may be obtained from the depth image, the color image, or camera information. Accordingly, the first linear system may have seven unknown quantities in total. Since three polynomials are provided by the first linear system and the seven unknown quantities exist in the first linear system, the first linear system may have innumerable solutions. The first linear system may be complemented through an additional analysis. Hereinafter, an example of an additional analysis method, and examples of obtaining lighting information and material information will be described with reference to FIGS. 2 through 7.

Figure 2:
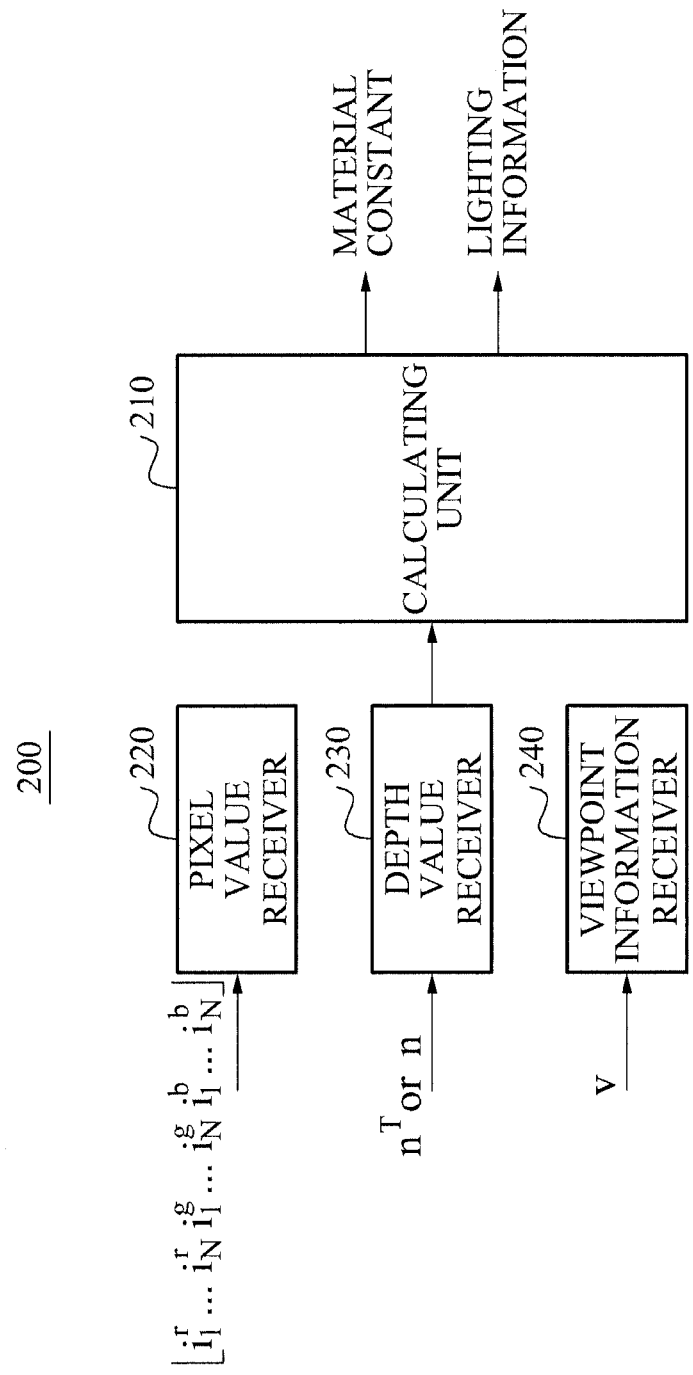
FIG. 2 illustrates a block diagram of an example of an apparatus for obtaining lighting information and material information according to example embodiments.

FIG. 2 illustrates a block diagram of an example of an apparatus for obtaining lighting information and material information according to example embodiments.

Referring to FIG. 2, an apparatus 200 for obtaining lighting information and material information may include a calculating unit 210, a pixel value receiver 220, a depth value receiver 230, and a viewpoint information receiver 240.

The calculating unit 210, which may be a computer, may obtain lighting information and material information using a second linear system defined as shown in Equation 3.

$$\begin{bmatrix} i_1^r & \ldots & i_N^r \\ i_1^g & \ldots & i_N^g \\ i_1^b & \ldots & i_N^b \end{bmatrix} = \begin{bmatrix} K_d^r & K_s \\ K_d^g & K_s \\ K_d^b & K_s \end{bmatrix} \begin{bmatrix} G_{1,d} & \ldots & G_{N,d} \\ G_{1,s} & \ldots & G_{N,s} \end{bmatrix} \qquad \text{[Equation 3]}$$

In Equation 3, N denotes a pixel index of a same material region. The "same material region" refers to a region having the same material properties. Additionally, material properties may be determined based on distribution of color difference signals in a color space domain. For example, when an object in an image is formed of a single material, N may have the same value as a number of pixels occupied by the object in the image. Additionally, $G_{N,d}$ denotes a combination of a geometry component and a lighting component for a diffuse reflection, and $G_{N,s}$ denotes a combination of a geometry component and a lighting component for a specular reflection. Referring to Equations 1 through 3, $G_{N,d}$ may be defined by a lighting constant and depth values, and $G_{N,s}$ may be defined by viewpoint information and the depth values.

For example, when at least three pixels are included in the same material region, the second linear system may have at least nine polynomials. The second linear system may also have seven unknown quantities, that is, four material variables and three 3D vector components of the lighting constant I. Accordingly, the unknown quantities of the second linear system may be respectively determined as unique values.

As a result, the calculating unit 210 may calculate a material constant of the same material region and lighting information of the same material region, by applying the color channel pixel values, the depth values, and the viewpoint information to a linear system in which a pixel value is defined by a material constant and a combination of a geometry component with a lighting component.

For example, when a multi-view image is used, an additional equation for the same number of unknown quantity may be obtained. A larger number of polynomials may be induced, by applying, to the second linear system, color channel pixel values, depth values, and viewpoint information that are acquired from the multi-view image. Specifically, N pixels $i_1, i_2, \ldots,$ and $i_N$ may be acquired from each of color images of multi-view image pairs of an object. An example of acquiring the N pixels and pixel values of the N pixels from each of the color images of the multi-view image pairs will be further described with reference to FIGS. 5A through 5C.

The pixel value receiver 220 may receive color channel pixel values of N pixels included in the same material region having the same material properties. For example, the pixel value receiver 220 may receive color channel pixel values $[i_1^r \ldots i_N^r i_1^g \ldots i_N^g i_1^b \ldots i_N^b]$, and may provide the received color channel pixel values $[i_1^r \ldots i_N^r i_1^g \ldots i_N^g i_1^b \ldots i_N^b]$ to the calculating unit 210. In this example, the color channel pixel values $[i_1^r \ldots i_N^r i_1^g \ldots i_N^g i_1^b \ldots i_N^b]$ may be acquired from each of the color images, and may be provided to the pixel value receiver 220.

The depth value receiver 230 may receive depth values of the same material region. For example, the depth value receiver 230 may receive depth values n of pixels $i_1, i_2, \ldots,$ and $i_N$, and may provide the received depth values n to the calculating unit 210. In this example, $n^T$, instead of n, may be provided to the calculating unit 210. Additionally, n or $n^T$ may be acquired from the depth images, and may be provided to the depth value receiver 230.

The viewpoint information receiver 240 may receive viewpoint information associated with the same material region. For example, the viewpoint information receiver 240 may receive viewpoint information V of each of pixels $i_1, i_2, \ldots,$ and $i_N$, and may provide the received viewpoint information V to the calculating unit 210. As described above through the first linear system, V is known in an image processing system (not illustrated).

The second linear system may be applied to a model employing a higher-order lighting function, as well as, the Phong model or the dichromatic model. In other words, the second linear system may be applied to a scheme employing a complex reflection model or a higher-order lighting function.

The calculating unit 210 may extract the material constant and lighting information of the same material region, using Equation 4 that will be further described later.

Figure 3:
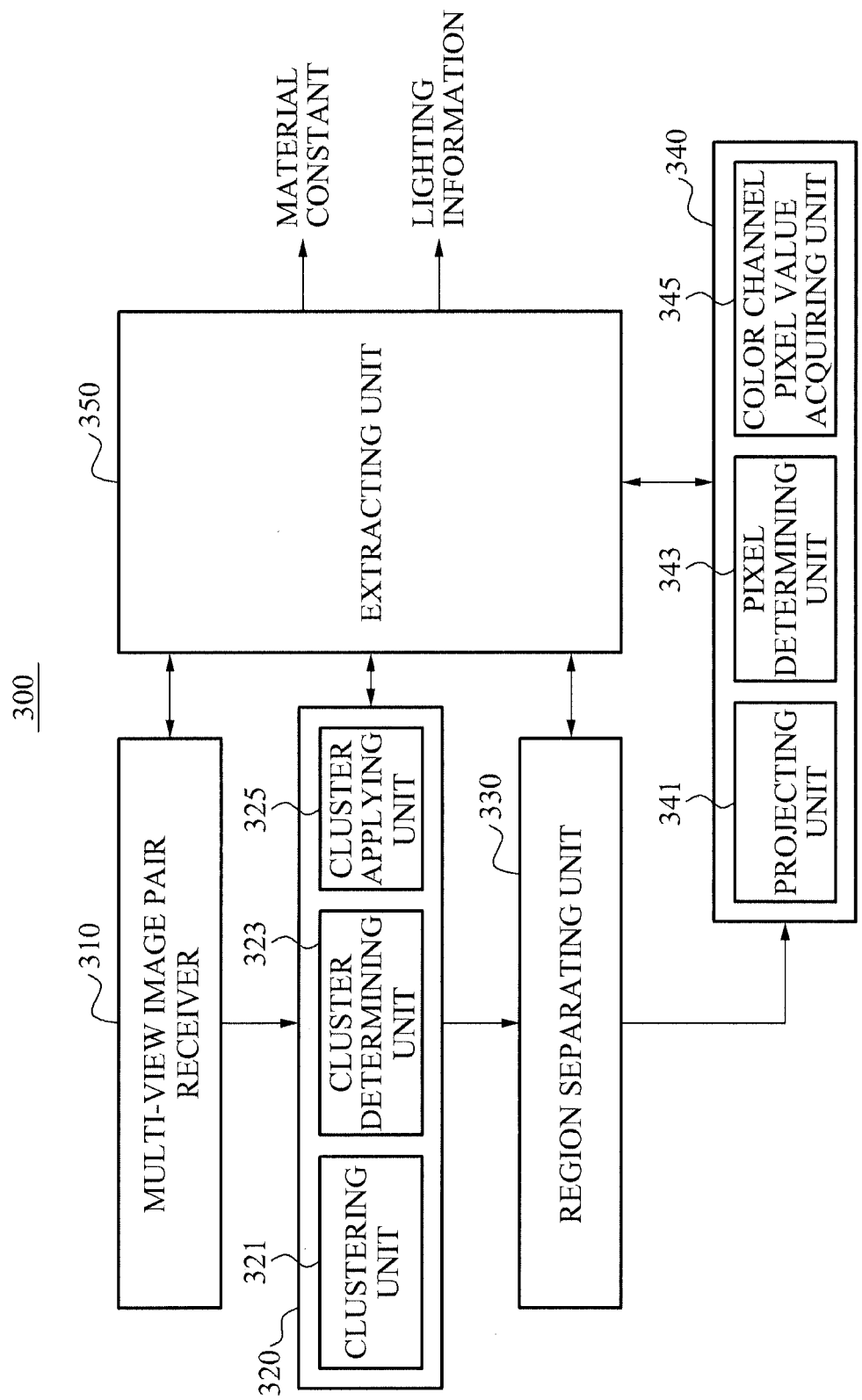
FIG. 3 illustrates a block diagram of another example of an apparatus for obtaining lighting information and material information according to example embodiments.

FIG. 3 illustrates a block diagram of another example of an apparatus for obtaining lighting information and material information according to example embodiments.

Referring to FIG. 3, an apparatus 300 for obtaining lighting information and material information, which may be a computer, may include a multi-view image pair receiver 310, a material property analyzing unit 320, a region separating unit 330, a pixel value acquiring unit 340, and an extracting unit 350.

The multi-view image pair receiver 310 may receive multi-view image pairs of an object, from an image capturing apparatus (not illustrated). Specifically, the multi-view image pair receiver 310 may receive color images and depth images that are acquired by capturing the object in a predetermined lighting environment. The multi-view image pairs may be acquired by a depth camera and a color camera. Additionally, the multi-view image pairs may also be acquired by a stereo camera, or a multi-view camera.

The material property analyzing unit 320 may analyze material properties of the object, using color images or depth images of the multi-view image pairs. The material property analyzing unit 320 may analyze the material properties, using values of color difference signals that are obtained by excluding a brightness component in a color space domain. Specifically, the material property analyzing unit 320 may perform clustering using the color difference signals as features, and may analyze the material properties. A color space may include, for example, HSV, CIELAB, and the like. Additionally, a color difference signal may include, for example, $C_r$, $C_b$, and the like, but the type of color difference signals may not be limited to $C_r$, $C_b$, and the like. For example, when clustering is performed based on values of color difference signals, C material clusters may be determined. In this example, C may be an integer equal to or greater than "1." Additionally, the material property analyzing unit 320 may perform the clustering for each viewpoint, and may combine results of the clustering for each viewpoint. Furthermore, the material property analyzing unit 320 may combine all color difference signals of a multi-view image, and may then perform the clustering. The material property analyzing unit 320 may include at least one processor configured to perform clustering.

The material property analyzing unit 320 may include a clustering unit 321, a cluster determining unit 323, and a cluster applying unit 325.

The clustering unit 321 may perform clustering on color difference signals of the color images in the color space domain, based on values of the color difference signals.

Figure 4:
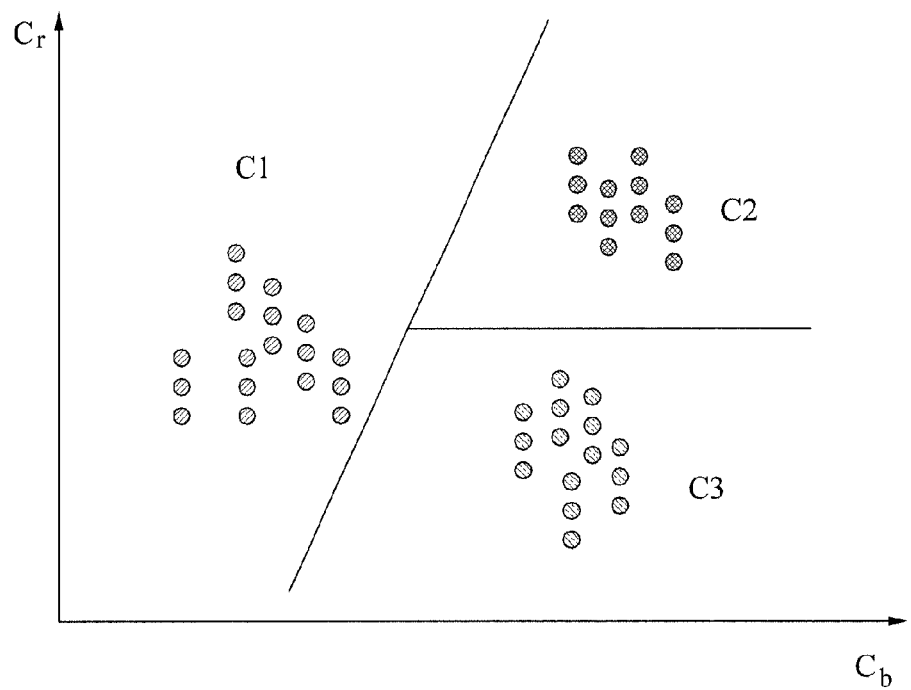
FIG. 4 illustrates a diagram of an example of analyzing material properties according to example embodiments.

The cluster determining unit 323 may determine C material clusters based on distribution of the color difference signals in the color space domain. C may be an integer. An example of the istribution of the color difference signals in the color space domain is shown in FIG. 4.

Figure 5A:
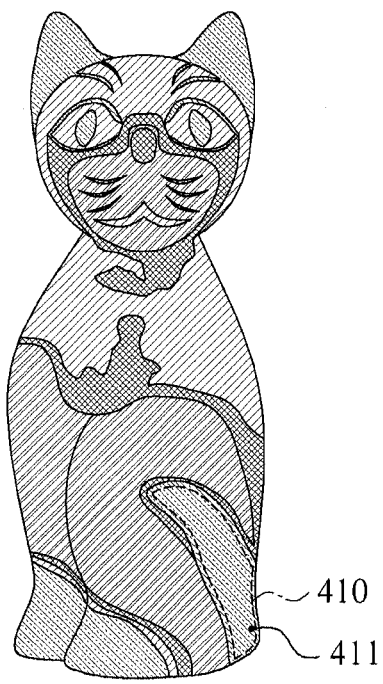
FIGS. 5A through 5C illustrate diagrams of an example of distinguishing material regions according to example embodiments.
Figure 5B:
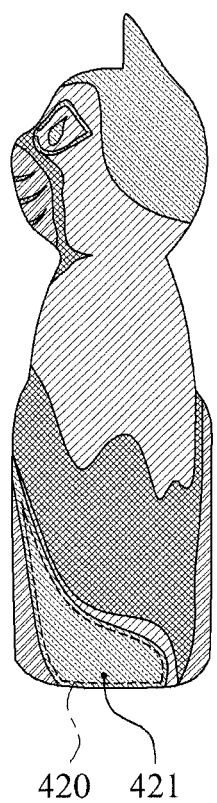
Figure 5C:
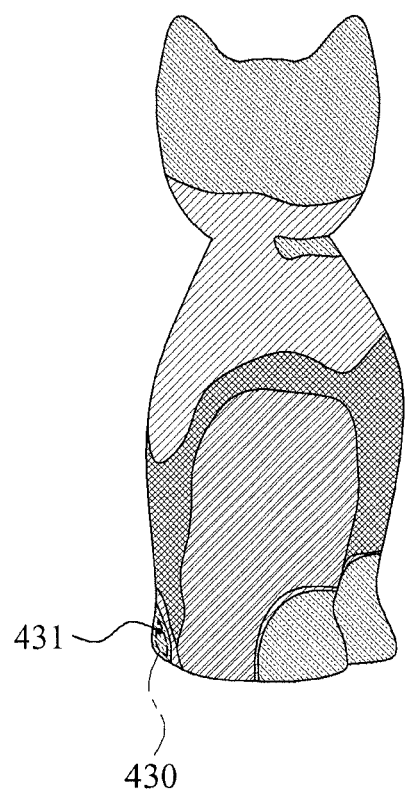

The cluster applying unit 325 may apply the C material clusters to the object. Specifically, the cluster applying unit 325 may divide a surface of the object for each of the material properties. An example of applying material clusters to an object is shown in FIGS. 5A through 5C. Referring to FIGS. 5A through 5C, material clusters may be distinguished by a color difference on a surface of an object.

The region separating unit 330 may separate a same material region having the same material properties from the object based on the material properties. The region separating unit 330 may select a material cluster from among the C material clusters, and may determine the same material region corresponding to the selected material cluster. When C material clusters exist, C same material regions may also exist. For example, when five same material regions exist, material constants may need to be calculated for each of the five same material regions. Accordingly, the region separating unit 330 may perform a function of selecting the same material region to calculate a current material constant. When the object is formed of a single material, a single same material region may exist.

The pixel value acquiring unit 340 may acquire, from each of the color images, color channel pixel values of a plurality of pixels included in the same material region. For example, when three color images are acquired from three viewpoints, the pixel value acquiring unit 340 may acquire, from each of the three color images, color channel pixel values of a plurality of pixels included in the same material region. An example of acquiring color channel pixel values from multi-view color images will be described with reference to FIGS. 5A through 5C.

The pixel value acquiring unit 340 may include a projecting unit 341, a pixel determining unit 343, and a color channel pixel value acquiring unit 345.

The projecting unit 341 may project C material regions corresponding to the C material clusters on each of the multi-view image pairs.

The pixel determining unit 343 may determine N pixels corresponding to all surface points in the same material region, using the multi-view image pairs.

The color channel pixel value acquiring unit 345 may acquire, from each of the color images, color channel pixel values of the N pixels.

The extracting unit 350 may extract a material constant and lighting information of the same material region, by applying the color channel pixel values to a linear system in which a pixel value is defined by a material constant and a combination of a geometry component with a lighting component. In other words, the extracting unit 350 may use the second linear system to extract the material constant and lighting information of the same material region.

Additionally, the extracting unit 350 may extract the material constant and the lighting information, using an optimal linear system defined as shown in Equation 4.

$$[K_d, K_s, 1] = \underset{K_d, K_s, 1}{\operatorname{argmin}} \left\| \begin{bmatrix} i_1^r & \ldots & i_N^r \\ i_1^g & \ldots & i_N^g \\ i_1^b & \ldots & i_N^b \end{bmatrix} - \begin{bmatrix} K_d^r & K_s \\ K_d^g & K_s \\ K_d^b & K_s \end{bmatrix} \begin{bmatrix} G_{1,d} & \ldots & G_{N,d} \\ G_{1,s} & \ldots & G_{N,s} \end{bmatrix} \right\|^2 \quad \text{[Equation 4]}$$

The extracting unit 350 may calculate material constants $[K_d^r\ K_d^g\ K_d^b\ K_s]$ and lighting constant I, using Equation 4. The lighting constant I may indicate lighting information, or lighting environment information.

In Equation 4, each of $[G_{1,d} \ldots G_{N,d} G_{1,s} \ldots G_{N,s}]$ denotes a combination of a geometry component and a lighting component. The geometry component may be represented as n in the form of a surface normal vector. n may be acquired from a depth image by a "cross product." V indicating viewpoint information or camera information may be a relative position value of a camera and a surface point at a corresponding viewpoint, and may be acquired from a depth image. Accordingly, $G_d$ and $G_s$ may be defined as shown in Equation 5.

$$G_d = n^T I, G_s = r^T v = (2(n^T I)n - I)^T v \quad \text{Equation 5}$$

FIG. 4 illustrates a diagram of an example of analyzing material properties according to example embodiments.

Referring to FIG. 4, color difference signals of pixels of a color image in a color space domain may be distributed in regions C1, C2, and C3. Each of the regions C1, C2, and C3 may represent a same material region. In other words, in the example of FIG. 4, three material clusters may be acquired. However, a scheme of distinguishing material properties may not be limited to the example of FIG. 4. The color space domain may be two-dimensionally represented as shown in FIG. 4, or may be three-dimensionally represented.

FIGS. 5A through 5C illustrate diagrams of an example of distinguishing material regions according to example embodiments.

Referring to FIGS. 5A through 5C, image pairs may be acquired from three viewpoints, respectively. For example, a region 410 of FIG. 5A, a region 420 of FIG. 5B, and a region 430 of FIG. 5C may be the same part of an object. In other words, the regions 410, 420, and 430 may correspond to a same material region. Hereinafter, an example of extracting material constants and lighting information associated with the regions 410, 420, and 430 will be described.

The pixel value acquiring unit 340 may determine pixels corresponding to the same surface point by matching a position of a multi-view color image to an object. In FIGS. 5A through 5C, points 411, 421 and 431 may correspond to the same surface point. The pixel value acquiring unit 340 may acquire color channel pixel values of all pixels within the region 410, color channel pixel values of all pixels within the region 420, and color channel pixel values of all pixels within the region 430. For example, when V1 pixels, V2 pixels, and V3 pixels are respectively included in the regions 410, 420, and 430, N in Equation 3 or Equation 4 may be a sum of V1, V2, and V3.

Figure 6:
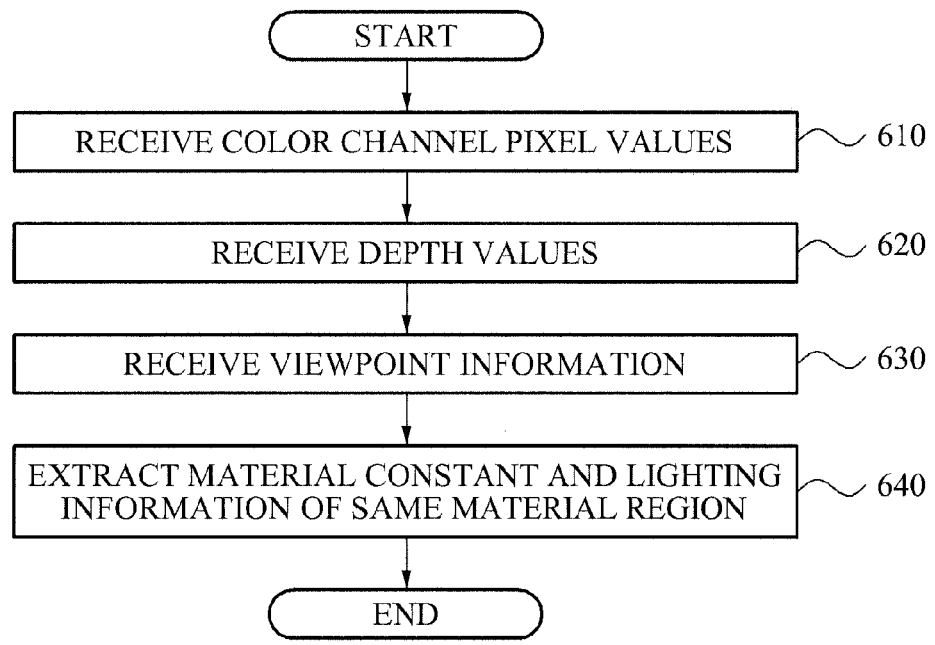
FIG. 6 illustrates a flowchart of an example of a method for obtaining lighting information and material information according to example embodiments.

FIG. 6 illustrates a flowchart of an example of a method for obtaining lighting information and material information according to example embodiments.

The method of FIG. 6 may be performed by the apparatus 200 of FIG. 2.

Referring to FIG. 6, in operation 610, the apparatus 200 may receive color channel pixel values of N pixels included in a same material region having the same material properties. N may be an integer equal to or greater than "2."

In operation 620, the apparatus 200 may receive depth values of the same material region.

In operation 630, the apparatus 200 may receive viewpoint information associated with the same material region.

In operation 640, the apparatus 200 may extract a material constant of the same material region and lighting information of the same material region, by applying the color channel pixel values, the depth values, and the viewpoint information to a linear system in which a pixel value is defined by a material constant and a combination of a geometry component with a lighting component.

Figure 7:
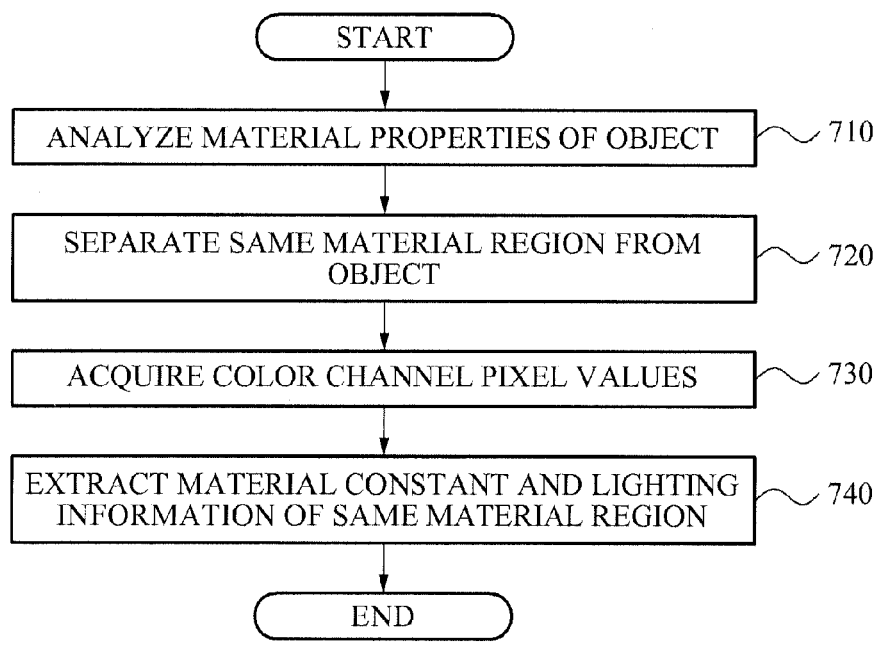
FIG. 7 illustrates a flowchart of another example of a method for obtaining lighting information and material information according to example embodiments.

FIG. 7 illustrates a flowchart of another example of a method for obtaining lighting information and material information according to example embodiments.

The method of FIG. 7 may be performed by the apparatus 300 of FIG. 3.

Referring to FIG. 7, in operation 710, the apparatus 300 may analyze material properties of an object, using color images or depth images. The color images and the depth images may form multi-view image pairs of the object.

In operation 720, the apparatus 300 may separate a same material region from the object, based on the material properties. The same material region may have the same material properties.

In operation 730, the apparatus 300 may acquire, from each of the color images, color channel pixel values of a plurality of pixels included in the same material region.

In operation 740, the apparatus 300 may extract a material constant of the same material region and lighting information of the same material region, by applying the color channel pixel values to a linear system in which a pixel value is defined by a material constant and a combination of a geometry component with a lighting component.

According to example embodiments, material information and lighting information may be extracted from multi-view image pairs captured in a predetermined light condition, even when an auxiliary device is additionally used. Thus, it is possible to more accurately and efficiently extract material information and lighting information, without an auxiliary device or complex processing.

According to example embodiments, it is possible to easily apply the example embodiments to a consumer electronics (CE) device, since material information and lighting information may be extracted without using an auxiliary device or a special device.

According to example embodiments, it is possible to perform modeling on a dynamic lighting environment and a dynamic object, since material information and lighting information may be extracted without using an auxiliary device or a special device.

The methods according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. A method for obtaining lighting information and material information in an image modeling system, the method comprising:
analyzing material properties of an object using each of color images of multi-view image pairs of the object, the multi-view image pairs each being formed from a depth image and a color image for a single viewpoint;
separating a material region from the object based on the material properties;
acquiring, from each of the color images, color channel pixel values of a plurality of pixels included in the material region;
extracting a material constant of the material region and lighting information of the material region, by applying the color channel pixel values to a linear system in which a pixel value is defined by a material constant and a combination of a geometry component with a lighting component, and
rendering an image of the object using the material constant and lighting information.

2. The method of claim 1, wherein the analyzing comprises:
performing clustering on color difference signals of the color images in a color space domain, based on values of the color difference signals;
determining C material clusters based on a distribution of the color difference signals in the color space domain, wherein C is an integer; and
applying the C material clusters to the object.

3. The method of claim 2, wherein the separating comprises:
selecting a material cluster from among the C material clusters; and
determining the material region corresponding to the selected material cluster.

4. The method of claim 2, wherein the acquiring comprises:
projecting C material regions on each of the multi-view image pairs, the C material regions corresponding to the C material clusters;
determining N pixels corresponding to all surface points in the material region, using the multi-view image pairs, wherein N is an integer equal to or greater than 2; and
acquiring, from each of the color images, color channel pixel values of the N pixels.

5. The method of claim 1, wherein the linear system is defined by the following equation:

$$\begin{bmatrix} i_1^r & \cdots & i_N^r \\ i_1^g & \cdots & i_N^g \\ i_1^b & \cdots & i_N^b \end{bmatrix} = \begin{bmatrix} K_d^r & K_s \\ K_d^g & K_s \\ K_d^b & K_s \end{bmatrix} \begin{bmatrix} G_{1,d} & \cdots & G_{N,d} \\ G_{1,s} & \cdots & G_{N,s} \end{bmatrix}$$

wherein $i^r$ denotes a red value of a pixel i, $i^g$ denotes a green value of the pixel i, $i^b$ denotes a blue value of the pixel i, N denotes a pixel index of the material region, $K_s$ denotes a material constant of a specular component, $K_d^r$ denotes a material constant of a diffuse component for $i^r$, $K_d^g$ denotes a material constant of a diffuse component for $i^g$, $K_d^b$ denotes a material constant of a diffuse component for $i^b$, $G_{N,d}$ denotes a combination of a geometry component and a lighting component for a diffuse reflection, and $G_{N,s}$ denotes a combination of a geometry component and a lighting component for a specular reflection.

6. The method of claim 5, wherein $G_{N,d}$ is defined by a lighting constant, and a depth value acquired from a depth image of each of the multi-view image pairs, and $G_{N,s}$ is defined by the depth value and viewpoint information that is represented by a position vector.

7. The method of claim 1, wherein the material constant and the lighting information of the material region are extracted by the following equation:

$$[K_d, K_s, 1] = \underset{K_d, K_s, 1}{\operatorname{argmin}} \left\| \begin{bmatrix} i_1^r & \cdots & i_N^r \\ i_1^g & \cdots & i_N^g \\ i_1^b & \cdots & i_N^b \end{bmatrix} - \begin{bmatrix} K_d^r & K_s \\ K_d^g & K_s \\ K_d^b & K_s \end{bmatrix} \begin{bmatrix} G_{1,d} & \cdots & G_{N,d} \\ G_{1,s} & \cdots & G_{N,s} \end{bmatrix} \right\|^2$$

wherein, $K_d$ denotes a material constant of a diffuse component, $i^r$ denotes a red value of a pixel i, $i^g$ denotes a green value of the pixel i, $i^b$ denotes a blue value of the pixel i, N denotes a pixel index of the material region, $K_s$ denotes a material constant of a specular component, $K_d^r$ denotes a material constant of a diffuse component for i r, $K_d^g$ denotes a material constant of a diffuse component for $i^g$, $K_d^b$ denotes a material constant of a diffuse component for $i^b$, $G_{N,d}$ denotes a combination of a geometry component and a lighting component for a diffuse reflection, and $G_{N,s}$ denotes a combination of a geometry component and a lighting component for a specular reflection.

8. A method for obtaining lighting information and material information in an image modeling system, the method comprising:
receiving color channel pixel values of N pixels included in a material region, the material region having the material properties, and N being an integer equal to or greater than 2;
receiving depth values of the material region;
receiving viewpoint information associated with the material region; and
extracting a material constant of the material region and lighting information of the material region, by applying the received color channel pixel values, the received depth values, and the received viewpoint information to a linear system in which a pixel value is defined by a material constant and a combination of a geometry component with a lighting component, and
rendering an image of the object using the material constant and lighting information.

9. The method of claim 8, wherein the material properties are determined based on a distribution of color difference signals in a color space domain.

10. The method of claim 8, wherein the N pixels are acquired from each of color images of multi-view image pairs of an object, the multi-view image pairs each being formed of a depth image and a color image for a single viewpoint.

11. The method of claim 8, wherein the linear system is defined by the following equation:

$$\begin{bmatrix} i_1^r & \cdots & i_N^r \\ i_1^g & \cdots & i_N^g \\ i_1^b & \cdots & i_N^b \end{bmatrix} = \begin{bmatrix} K_d^r & K_s \\ K_d^g & K_s \\ K_d^b & K_s \end{bmatrix} \begin{bmatrix} G_{1,d} & \cdots & G_{N,d} \\ G_{1,s} & \cdots & G_{N,s} \end{bmatrix}$$

wherein $i^r$ denotes a red value of a pixel i, $i^g$ denotes a green value of the pixel i, $i^b$ denotes a blue value of the pixel i, N denotes a pixel index of the material region, $K_s$ denotes a material constant of a specular component, $K_d^r$ denotes a material constant of a diffuse component for $i^r$, $K_d^g$ denotes a material constant of a diffuse component for $i^g$, $K_d^b$ denotes a material constant of a diffuse component for $i^b$, $G_{N,d}$ denotes a combination of a geometry component and a lighting component for a diffuse reflection, and $G_{N,s}$ denotes a combination of a geometry component and a lighting component for a specular reflection.

12. The method of claim 11, wherein $G_{N,d}$ is defined by a lighting constant and the depth values, and $G_{N,s}$ is defined by the depth values and the viewpoint information.

13. The method of claim 8, wherein the material constant and the lighting information of the material region are extracted by the following equation:

$$[K_d, K_s, 1] = \underset{K_d, K_s, 1}{\operatorname{argmin}} \left\| \begin{bmatrix} i_1^r & \cdots & i_N^r \\ i_1^g & \cdots & i_N^g \\ i_1^b & \cdots & i_N^b \end{bmatrix} - \begin{bmatrix} K_d^r & K_s \\ K_d^g & K_s \\ K_d^b & K_s \end{bmatrix} \begin{bmatrix} G_{1,d} & \cdots & G_{N,d} \\ G_{1,s} & \cdots & G_{N,s} \end{bmatrix} \right\|^2$$

wherein, $K_d$ denotes a material constant of a diffuse component, $i^r$ denotes a red value of a pixel i, $i^g$ denotes a green value of the pixel i, $i^b$ denotes a blue value of the pixel i, N denotes a pixel index of the material region, $K_s$ denotes a material constant of a specular component, $K_d^r$ denotes a material constant of a diffuse component for $i^r$, $K_d^g$ denotes a material constant of a diffuse component for $i^g$, $K_d^b$ denotes a material constant of a diffuse component for $i^b$, $G_{N,d}$ denotes a combination of a geometry component and a lighting component for a diffuse reflection, and $G_{N,s}$ denotes a combination of a geometry component and a lighting component for a specular reflection.

14. An apparatus for obtaining lighting information and material information in an image modeling system, the apparatus comprising:
a pixel value receiver to receive color channel pixel values of N pixels included in a material region, the material region having the material properties, and N being an integer equal to or greater than 2;
a depth value receiver to receive depth values of the material region;
a viewpoint information receiver to receive viewpoint information associated with the material region; and
a calculating unit to calculate a material constant of the material region and lighting information of the material region, by applying the color channel pixel values, the depth values, and the viewpoint information to a linear system in which a pixel value is defined by a material constant and a combination of a geometry component with a lighting component.

15. The apparatus of claim 14, wherein the material properties are determined based on a distribution of color difference signals in a color space domain.

16. The apparatus of claim 14, wherein the N pixels are acquired from each of color images of multi-view image pairs of an object, the multi-view image pairs each being formed of a depth image and a color image for a single viewpoint.

17. The apparatus of claim 14, wherein the linear system is defined by the following equation:

$$\begin{bmatrix} i_1^r & \cdots & i_N^r \\ i_1^g & \cdots & i_N^g \\ i_1^b & \cdots & i_N^b \end{bmatrix} = \begin{bmatrix} K_d^r & K_s \\ K_d^g & K_s \\ K_d^b & K_s \end{bmatrix} \begin{bmatrix} G_{1,d} & \cdots & G_{N,d} \\ G_{1,s} & \cdots & G_{N,s} \end{bmatrix}$$

wherein $i^r$ denotes a red value of a pixel i, $i^g$ denotes a green value of the pixel i, $i^b$ denotes a blue value of the pixel i, N denotes a pixel index of the material region, $K_s$ denotes a material constant of a specular component, $K_d^r$ denotes a material constant of a diffuse component for $i^r$, $K_d^g$ denotes a material constant of a diffuse component for $i^g$, $K_d^b$ denotes a material constant of a diffuse component for $i^b$, $G_{N,d}$ denotes a combination of a geometry component and a lighting component for a diffuse reflection, and $G_{N,s}$ denotes a combination of a geometry component and a lighting component for a specular reflection.

18. The apparatus of claim 17, wherein $G_{N,d}$ is defined by a lighting constant and the depth values, and $G_{N,s}$ is defined by the depth values and the viewpoint information.

19. The apparatus of claim 14, wherein the material constant and the lighting information of the material region are extracted by the following equation:

$$[K_d, K_s, 1] = \underset{K_d, K_s, 1}{\mathrm{argmin}} \left\| \begin{bmatrix} i_1^r & \cdots & i_N^r \\ i_1^g & \cdots & i_N^g \\ i_1^b & \cdots & i_N^b \end{bmatrix} - \begin{bmatrix} K_d^r & K_s \\ K_d^g & K_s \\ K_d^b & K_s \end{bmatrix} \begin{bmatrix} G_{1,d} & \cdots & G_{N,d} \\ G_{1,s} & \cdots & G_{N,s} \end{bmatrix} \right\|^2$$

wherein, $K_d$ denotes a material constant of a diffuse component, $i^r$ denotes a red value of a pixel i, $i^g$ denotes a green value of the pixel i, $i^b$ denotes a blue value of the pixel i, N denotes a pixel index of the material region, $K_s$ denotes a material constant of a specular component, $K_d^r$ denotes a material constant of a diffuse component for $i^r$, $K_d^g$ denotes a material constant of a diffuse component for $i^g$, $K_d^b$ denotes a material constant of a diffuse component for $i^b$, $G_{N,d}$ denotes a combination of a geometry component and a lighting component for a diffuse reflection, and $G_{N,s}$ denotes a combination of a geometry component and a lighting component for a specular reflection.

20. An apparatus for obtaining lighting information and material information in an image modeling system, the apparatus comprising:
 a material property analyzing unit to analyze material properties of an object using each of color images of multi-view image pairs of the object, the multi-view image pairs each being formed of a depth image and a color image for a single viewpoint;
 a region separating unit to separate a material region from the object based on the material properties, the material region having the material properties;
 a pixel value acquiring unit to acquire, from each of the color images, color channel pixel values of a plurality of pixels included in the material region; and
 an extracting unit to extract a material constant of the material region and lighting information of the material region, by applying the color channel pixel values to a linear system in which a pixel value is defined by a material constant and a combination of a geometry component with a lighting component.

21. The apparatus of claim 20, wherein the material property analyzing unit comprises:
 a clustering unit to perform clustering on color difference signals of the color images in a color space domain, based on values of the color difference signals;
 a cluster determining unit to determine C material clusters based on a distribution of the color difference signals in the color space domain, wherein C is an integer; and
 a cluster applying unit to apply the C material clusters to the object.

22. The apparatus of claim 20, wherein the region separating unit selects a material cluster from among the C material clusters, and determines the material region corresponding to the selected material cluster.

23. The apparatus of claim 20, wherein the pixel value acquiring unit comprises:
 a projecting unit to project C material regions on each of the multi-view image pairs, respectively, the C material regions corresponding to the C material clusters;
 a pixel determining unit to determine N pixels corresponding to all surface points in the material region, using the multi-view image pairs, wherein N is an integer equal to or greater than 2; and
 a color channel pixel value acquiring unit to acquire, from each of the color images, color channel pixel values of the N pixels.

24. The apparatus of claim 20, wherein the linear system is defined by the following equation:

$$\begin{bmatrix} i_1^r & \cdots & i_N^r \\ i_1^g & \cdots & i_N^g \\ i_1^b & \cdots & i_N^b \end{bmatrix} = \begin{bmatrix} K_d^r & K_s \\ K_d^g & K_s \\ K_d^b & K_s \end{bmatrix} \begin{bmatrix} G_{1,d} & \cdots & G_{N,d} \\ G_{1,s} & \cdots & G_{N,s} \end{bmatrix}$$

wherein $i^r$ denotes a red value of a pixel i, $i^g$ denotes a green value of the pixel i, $i^b$ denotes a blue value of the pixel i, N denotes a pixel index of the material region, $K_s$ denotes a material constant of a specular component, $K_d^r$ denotes a material constant of a diffuse component for $i^r$, $K_d^g$ denotes a material constant of a diffuse component for $i^g$, $K_d^b$ denotes a material constant of a diffuse component for $i^b$, $G_{N,d}$ denotes a combination of a geometry component and a lighting component for a diffuse reflection, and $G_{N,s}$ denotes a combination of a geometry component and a lighting component for a specular reflection.

25. The apparatus of claim 20, wherein the material constant and the lighting information of the material region are extracted by the following equation:

$$[K_d, K_s, 1] = \underset{K_d, K_s, 1}{\mathrm{argmin}} \left\| \begin{bmatrix} i_1^r & \cdots & i_N^r \\ i_1^g & \cdots & i_N^g \\ i_1^b & \cdots & i_N^b \end{bmatrix} - \begin{bmatrix} K_d^r & K_s \\ K_d^g & K_s \\ K_d^b & K_s \end{bmatrix} \begin{bmatrix} G_{1,d} & \cdots & G_{N,d} \\ G_{1,s} & \cdots & G_{N,s} \end{bmatrix} \right\|^2$$

wherein, $K_d$ denotes a material constant of a diffuse component, $i^r$ denotes a red value of a pixel i, $i^g$ denotes a green value of the pixel i, $i^b$ denotes a blue value of the pixel i, N denotes a pixel index of the material region, $K_s$ denotes a material constant of a specular component, $K_d^r$ denotes a material constant of a diffuse component for $i^r$, $K_d^g$ denotes a material constant of a diffuse component for $i^g$, $K_d^b$ denotes a material constant of a diffuse component for $i^b$, $G_{N,d}$ denotes a combination of a geometry component and a lighting component for a diffuse reflection, and $G_{N,s}$ denotes a combination of a geometry component and a lighting component for a specular reflection.

* * * * *